W. D. McGOWAN.
ROTARY POWER MEMBER.
APPLICATION FILED MAR. 17, 1916.
1,232,946.
Patented July 10, 1917.
3 SHEETS—SHEET 1.
Fig. 1, Fig. 2, Fig. 3, Fig. 4,
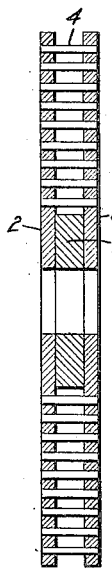
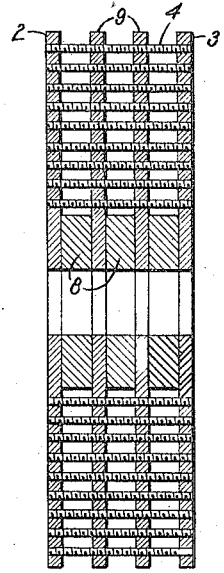
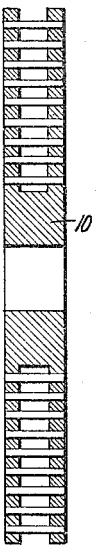
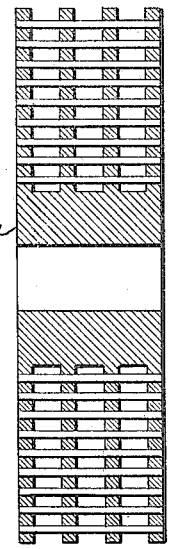
Fig. 5,
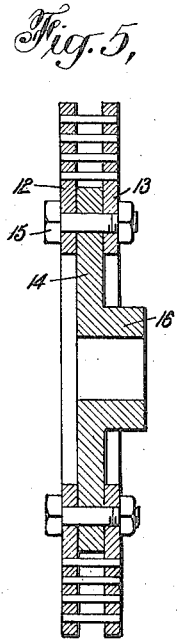
Fig. 6
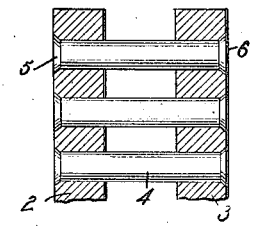
Fig. 7
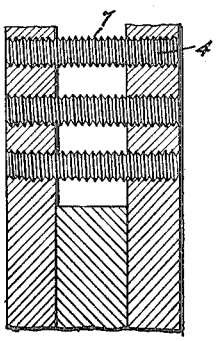
WITNESSES
INVENTOR
William D. McGowan
BY
ATTORNEYS

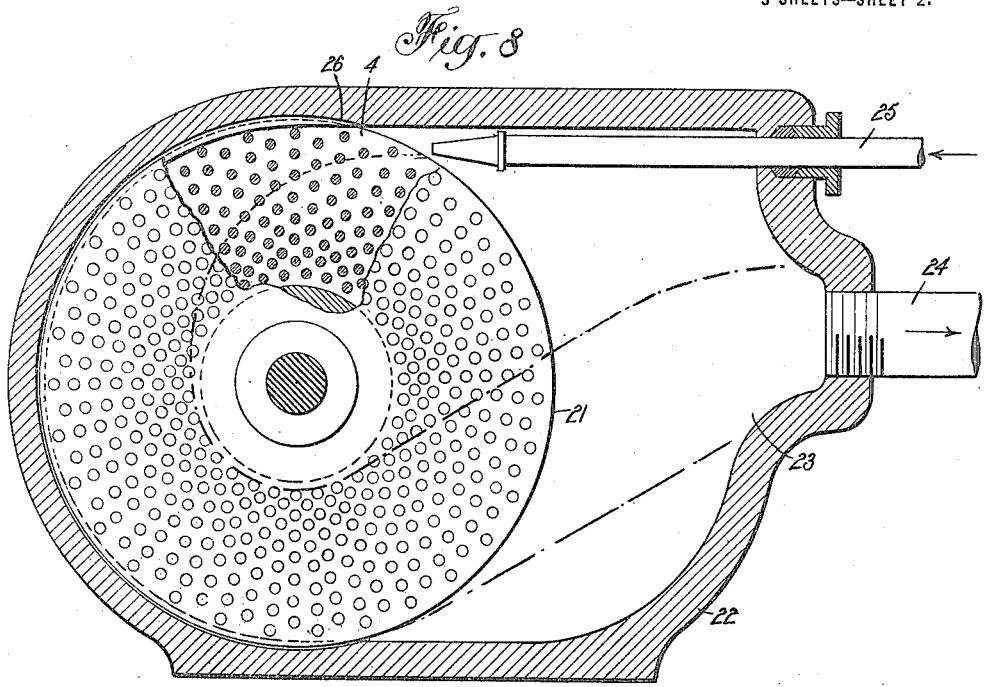

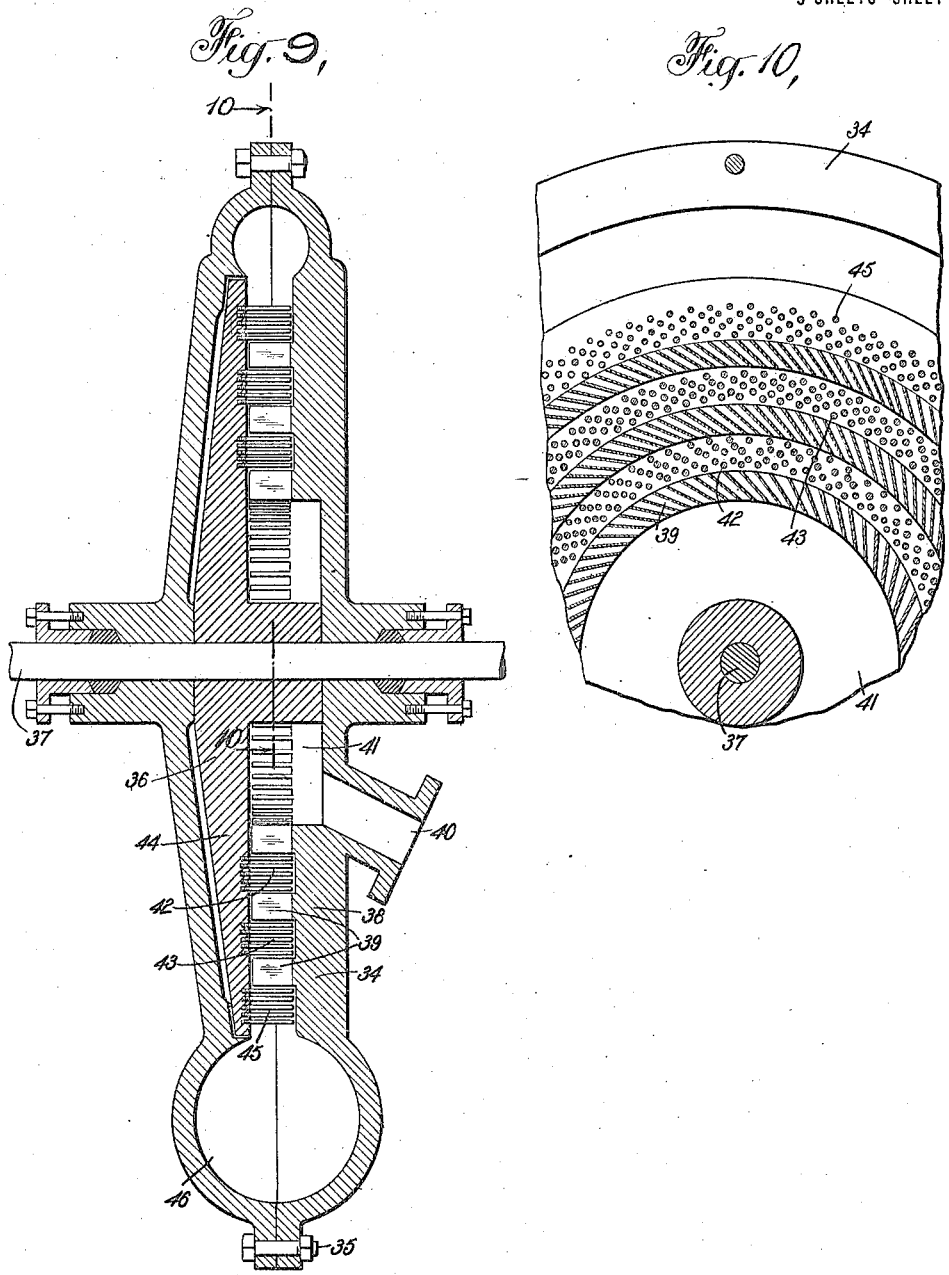

UNITED STATES PATENT OFFICE.

WILLIAM D. McGOWAN, OF JERSEY CITY, NEW JERSEY.

ROTARY POWER MEMBER.

1,232,946.     Specification of Letters Patent.     Patented July 10, 1917.

Application filed March 17, 1916. Serial No. 84,914.

*To all whom it may concern:*

Be it known that I, WILLIAM D. McGOWAN, a citizen of the United States, and a resident of Jersey City, in the county of Hudson and State of New Jersey, have invented a new and Improved Rotary Power Member, of which the following is a full, clear, and exact description.

This invention relates to a power member and particularly to a rotary power member and has for an object to provide an improved construction whereby the power member may be rotated in either direction merely upon the reversal of the flow of the propelling medium.

Another object in view is to provide a rotary power member which is provided with round blades whereby the blades will react against a propelling medium flowing in either direction.

A still further object in view is to provide a rotary power member which may receive the stream of a propelling medium on the periphery or on the side.

A still further object in view is to provide a rotary member having a plurality of round blades formed in a substantially staggered relationship and grouped so that the propelling medium, as for instance, water, gas, steam or compressed air, will engage the blades successively until the blades have attained or substantially attained the speed of the propelling medium.

In the accompanying drawings:—

Figure 1 is a longitudinal vertical section through a rotary member disclosing an embodiment of the invention.

Fig. 2 is a view similar to Fig. 1 but disclosing a modification whereby a plurality of independent chambers are provided.

Fig. 3 is a view similar to Fig. 1 but disclosing a further modified form of the invention whereby the body of the member is formed in one piece instead of being built up.

Fig. 4 is a view similar to Fig. 3, disclosing a modified form of the invention whereby a body is formed as shown in Fig. 3.

Fig. 5 is a longitudinal vertical section through a slightly modified form of the invention to that shown in Fig. 1.

Fig. 6 is an enlarged detail fragmentary view showing how the pins or blades are mounted in position.

Fig. 7 discloses a slightly modified form of blades to that shown in Fig. 6.

Fig. 8 is a longitudinal vertical section through a complete device disclosing an embodiment of the invention, certain parts being broken away for better illustrating the construction.

Fig. 9 is a longitudinal vertical section through a further modified form of the invention.

Fig. 10 is a section through Fig. 9 on line 10—10.

In constructing the device embodying the invention a large variety of different constructions may be provided, all of which retain the same inventive idea. In any form of the invention the structure will utilize water, steam, compressed air or other gaseous matter under pressure and will utilize such gaseous matter until substantially all of the energy has been expended. In addition, the blades receiving the impact act in either direction, so that by merely changing the direction of flow of the impelling medium the rotary member of the motor will be reversed.

Referring to the accompanying drawings by numerals, 1 indicates a hub construction to which side plates 2 and 3 (Fig. 1) are secured in any desired manner, as for instance, by rivets or by being welded thereto. The plates 2 and 3 are provided with apertures into which round pins 4 are mounted. These pins may be arranged as shown in Fig. 6, namely, with the ends 5 and 6 riveted or upset so as to fill suitable countersunk portions in the plates 2 and 3. As a slight modified form the pins 4 may be provided with ridges 7, which ridges may be in the nature of threads or may be merely annular beads whereby a greater surface is provided for receiving the impact of steam or other gaseous matter. Preferably these ridges are threads, as by utilizing this structure the various pins may be secured into position and the extra surface provided by the same construction.

In Fig. 2 a plurality of hub sections 8 are utilized so that there will be provided side plates 2 and 3 and a plurality of intermediate plates 9. The pins 4 in this form of the invention extend through all of the plates but are preferably secured only to the outer plates, as shown in Fig. 6, though when the threaded portions are used, as shown in Fig. 7, the threads may loosely engage the plates 2 and 3.

In Figs. 3 and 4 a further modified form of the invention is shown in which, instead of building up the rotary member as shown in Figs. 1 and 2, the rotary bodies 10 and 11 are formed solid or integral throughout but with the pins inserted as heretofore described.

In Fig. 5 another arrangement is shown disclosing the same inventive idea, namely, side rings 12 and 13 are provided to which a plate 14 is secured by suitable means, as for instance, bolts 15, said plate being provided with a hub 16.

Referring more particularly to Fig. 8, a complete construction is shown in which the rotary member 21, similar to the structure shown in Fig. 1, is provided with a casing 22 part of which fits the rotary member 21 and the remaining part is arranged so as to produce a chamber 23 and an end into which the discharge pipe 24 may be fitted as well as the inlet tube 25. The inlet tube 25 is designed to carry steam, compressed air or other gaseous matter under pressure so as to discharge the same against the various blades 4, the discharge of the steam being adjacent the point 26 where the member 21 conforms to the shape of the casing 22. As the steam first enters the rotary member 21 the same strikes against the outer blades but gradually spreads as expansion takes place until the steam or other gaseous matter is acting on all of the blades down to the base or center member 1. In this way the gradually expanding fluid is allowed to act on more and more blades and as the same glances off one blade it strikes the next blade and so on until finally the steam enters the chamber 23 and at a comparatively low pressure, from which it is exhausted out through the exhaust pipe 24. It is of course understood that the exhaust pipe 24 is made of the same size or preferably larger than the largest part of the passageway through which the steam must pass when passing through the rotary member 21.

It will be observed that the steam is taken in at the periphery in Fig. 8 and acts on blades extending axially. It is of course evident that the nozzles or intake passageways could be variously arranged without departing from the spirit of the invention so that the rotary members may be reversed or may be caused to move constantly in one direction. It is also evident that two nozzles could be provided so that instead of moving the nozzles merely one nozzle could be shut off and the other allowed to operate.

In Figs. 9 and 10 a further modified form of the invention is shown in which the same principle is utilized but the steam is caused to enter at the hub and to exhaust at the periphery. It will be observed that the casing 34 is made in two parts and secured together by suitable bolts 35. In the casing a rotary member 36 is arranged which may be rigidly secured to shaft 37. The section 38 of casing 34 is provided with a plurality of guiding blades 39, which blades are of course stationary and all extend in the same general direction, as shown more particularly in Fig. 10. By a general direction is meant a tangent so that steam passing into opening 40 will enter the steam chamber 41 and will then pass through the first set of blades 39 and strike the propeller blades 42. After passing through the propeller blades 42 the steam is gathered into streams, in a certain sense, and by the second set of blades 39 so that these streams will discharge properly against a second set of power blades 43 extending horizontally from the base 44. After passing the blades 43 the steam is again directed by the outer series of blades 39 to the outer power blades 45, after which the steam enters the exhaust chamber 46, from which chamber the steam may be led to a suitable discharge point. By the arrangement described the steam is caused to properly strike the power blades as jets, whereby the maximum efficiency is produced and the speed of the power blades caused to approach as near as possible the speed of the steam or other medium used.

What I claim is:

In a device of the character described, a rotary member formed with an annular chamber and a plurality of concentric rows of blades round in cross section extending through said chamber, said rows being staggered and also arranged so that the blades extend from the center of the chamber to the periphery in curved rows and radially in straight rows.

In witness whereof I have signed my name to this specification in the presence of two subscribing witnesses.

WILLIAM D. McGOWAN.

Witnesses:
A. L. KITCHIN,
PHILIP D. ROLLHAUS.

Copies of this patent may be obtained for five cents each, by addressing the "Commissioner of Patents, Washington, D. C."